Dec. 14, 1926.
C. P. WETMORE
1,610,909
GAUGE FOR THE THREADS OF PIPE COUPLINGS
Filed June 5, 1925
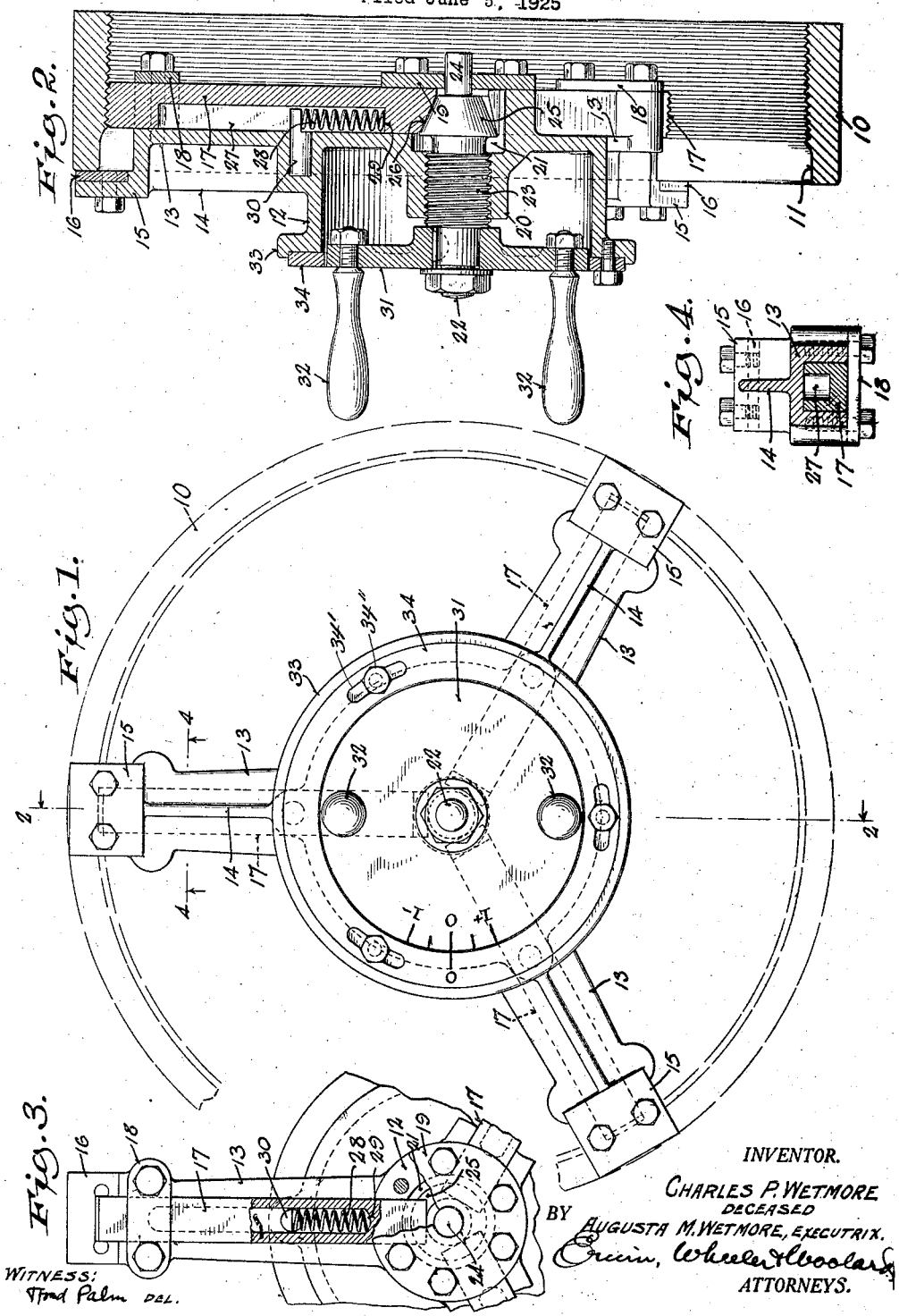
INVENTOR.
CHARLES P. WETMORE
DECEASED
BY AUGUSTA M. WETMORE, EXECUTRIX.
ATTORNEYS.
WITNESS:

Patented Dec. 14, 1926.

1,610,909

UNITED STATES PATENT OFFICE.

CHARLES P. WETMORE, DECEASED, LATE OF MILWAUKEE, WISCONSIN; BY AUGUSTA M. WETMORE, EXECUTRIX, OF MILWAUKEE, WISCONSIN, ASSIGNOR TO A. O. SMITH CORPORATION, OF MILWAUKEE, WISCONSIN, A CORPORATION OF NEW YORK.

GAUGE FOR THE THREADS OF PIPE COUPLINGS.

Application filed June 5, 1925. Serial No. 35,232.

In the manufacture of pipe couplings of large diameter, and particularly those which are used for connecting the ends of lengths of pipe which are employed in forming the lining for deep wells, it is essential that the threading of such couplings measure exactly to the required standards of accuracy. Failure to apply proper initial tests to the threading is sometimes productive later of situations which prove to be troublesome and difficult of correction.

In applying such initial tests to determine the accuracy of the work, it has heretofore been the practice after threading to screw the tapering threaded end of the pipe coupling onto a tapered threaded plug of the required diameter, testing both ends of the coupling in the same manner. Again, it has been the practice, while the coupling is still chucked in the lathe, to screw the plug therein, making a like test of the other end of the coupling, when the latter was reversed in the lathe. Both of these methods were performed with difficulty, by reason of the weight of the coupling in the first case, and the weight of the plug in the second. Moreover, great physical labor was involved in each instance in turning the part so as to run the threads up to the required depth in making the test, and then in unscrewing to effect disconnection. If the tests indicated that the coupling was not correctly threaded, a further threading operation became necessary, with much attendant labor.

The present invention is embodied in a comparatively light and portable device for testing the threading of the coupling while the latter remains chucked in the lathe, so that if correction be indicated as necessary, the matter may receive attention at once.

The device comprises a spider on each of the several radial arms of which a feeler provided at its outer end with threads for engaging the threads of the coupling is mounted for longitudinal movement, that is, movements which are radial to the spider. The threads upon the ends of the feelers have the same pitch as the threads of the coupling, and are designed to effect an accurate engagement therewith.

At their inner ends, the thread feelers are engaged by an axially movable, rotating thrust cam in the form of a cone, which acts to push the feelers outwardly to effect their thread testing engagement with the coupling. The conical cam is mounted on a screw-shaft threaded into the spider, so that in the forward rotation of the shaft, the cone is advanced to accomplish its purpose. Confined springs serve to withdraw the feelers and hold their inner ends in contact with the cone, when the shaft of the latter is reversely rotated.

The spider is provided on its front face with a zero mark, and the rotating shaft with a dial having on its face a like zero mark, the dial having also indications or gradations extending oppositely from such zero mark. When properly positioned with the thread feelers in engagement with the threads of the coupling, the relation to each other of the marks on the two scales will indicate at once the plus or minus errors, if any, in the threading of the coupling, so that the extent of the correction to be made can be determined, and correction made without disturbing the position of the coupling in the lathe chuck.

The details of construction in which the invention has been embodied will now be particularly described, and the novelty residing therein will be pointed out in the appended claim.

In the accompanying drawing:

Figure 1 is a view in elevation of the improved thread testing and gauging device, showing the same as positioned in relation to a pipe coupling for a testing operation, the coupling being shown in broken lines.

Fig. 2 is a vertical sectional view axially of the device, on the line 2—2, Fig. 1, looking in the direction of the arrows, and showing the arrangement of the parts thereof.

Fig. 3 is a view opposite to that of Fig. 1, showing certain details of the construction and arrangement of the parts in connection with one of the thread feelers.

Fig. 4 is a transverse sectional view on the line 4—4, Fig. 1, showing further details of construction.

In the drawing, the numeral 10 indicates a pipe coupling provided with a bore which tapers from its ends to a median line, at which exists a constriction of the bore, and counter-bored at its ends so as to constitute clearances, one of which is indicated at 11, in Fig. 2.

A central frame 12, in the form of a cup, and provided with a plurality of radial arms 13, forms the skeleton or spider of the device. The said arms lie in the plane of the bottom of the cup, and may be reinforced by ribs 14 formed upon their front sides. At their outer ends, the arms are shouldered and carry extensions forming fingers 15, to which may be attached wear plates 16 of hardened metal, which are designed to abut the end face of the coupling 10 at the several bearing points, and limit the entry of the device when the latter is positioned in the bore of the coupling for a thread testing operation.

The radial arms 13 are provided upon their rear sides with channels in which the feelers 17 are mounted for reciprocation. Straps 18, attached to the arms 13, bridge the channels separately near the outer ends of the arms, and a disc 19 secured co-axially to the cup 12 at the rear side of the bottom thereof, bridges all of the channels at their converging ends, the straps and disc confining the feelers 17 in the channels, but permitting their longitudinal movement therein, that is, their radial reciprocation with respect to the spider.

The bottom of the cup 12 is provided with an inwardly projecting central boss 20, and at its rear side is formed a circular recess 21, which latter is covered by the disc 19. A shaft 22, threaded over an intermediate portion of its length as at 23, works in a threaded opening in the said boss, and the reduced rear end 24 of the shaft 22 is journaled for rotation, and to have a sliding movement as well, in the disc 19.

A conical thrust cam 25, formed upon the shaft 22, is disposed in the recess 21, at the rear side of the cup 12, and the tapering surface of the said cam is in engagement with the correspondingly beveled inner ends 26 of the feelers 17. The said feelers are grooved for a portion of their length upon the side which abuts the bottom of the channel in the arm 13, as at 27, and an expansion spring 28 is confined in the said groove, the spring bearing at one end against the wall 29 at the inner end of the groove, and at the other end against a pin 30, set in the rear side of the cup 12 and projecting into the said groove. The springs 28 act at all times to hold the beveled ends of the feelers 17 in contact with the conical thrust cam 25, and so serve to retract the feelers when the cam is withdrawn into its inoperative position, by reverse rotation of the screwshaft.

The shaft 22 has keyed upon its outer end, a crank disc 31, provided with crank handles 32, two of such handles being employed to render the operation of the device more convenient, and permit the balancing of the forces exerted in rotating the shaft. In the rotation of the shaft, the disc 31 will move into and out of the cup.

The rim of the cup 12 is provided with a flange 33, in which is formed a circular recess for the reception of a ring 34, having a zero mark thereon. The ring may be adjusted by rotation about its axis and fixed in adjusted position by means of arcuate slots 34', through which cap screws 34'' are passed and engaged in threaded openings in the flange 33 of the cup. The diameter of the opening in the ring 34 is designed to register with that of the cup 12. But the ring with its provisions for adjustment may be omitted, and the zero mark placed on the rim of the cup 12.

The crank disc 31 also forms the indicating dial previously referred to, and is provided at its margin with a zero mark for registering with that on the ring 34, and with gradations extending at each side thereof.

In operation, the thrust cam 25 is withdrawn by reverse rotation of the screw shaft 22, and the feelers automatically assume their retracted positions under the action of the springs 28, which maintains the contact of the converging ends of the feelers with the cam. The gauging device is positioned by entering it into the end of the threaded coupling, still chucked in the lathe, until the several wear plates 16 on the fingers 15 of the arms 13 contact with the faced end of the coupling. The shaft 22 is then rotated forwardly and in the axial movement of the said shaft, due to its screw mounting, the thrust cam 25 impels an outward movement of the several feelers, until the threaded ends of the latter are in engagement with the threads of the coupling, and the further rotation of the shaft is arrested. By slightly rotating the whole device at this time, it can be determined whether the threaded ends of the feelers are accurately and properly engaged with the threads of the coupling, and the slack motion, if any, can then be taken up by further rotating the screw shaft the necessary extent. At the time that such perfected engagement of the threads is effected, the zero marks will register, if the work is correct. If they do not register, the relative positions of the zero marks on the scales will indicate any plus or minus variations from the correct internal diameter of the threaded coupling, and thus the extent of the corrections to be made to conform the work to standard are readily ascertained. Reverse rotation of the shaft 22 will effect collapse of the feelers 17, so that the gauging device may be withdrawn from the coupling. Very little effort is involved in the use of the portable device, and its functions are achieved with a great saving of time and labor, over the devices heretofore used for the same purpose.

Having thus described the invention, what I claim and desire to secure by Letters Patent of the United States, is:

A device for testing the accuracy of the threads of pipe couplings, comprising a body provided with a plurality of radially extending arms having fingers to engage the end of the coupling, feelers having thread gauging outer ends mounted for movement lengthwise of the said arms, a rotatable shaft threaded centrally into the said body and having a conical thrust cam contacting with the converging inner ends of the feelers and acting to engage the outer ends of the feelers with the threads of the coupling, expansion springs confined between the arms and feelers to maintain the contact between the feelers and the cam as the latter is withdrawn, and markers associated with the body and shaft for indicating variations in the threads of the coupling.

In testimony whereof, I have signed my name at Milwaukee, this 3d day of June, 1925.

AUGUSTA M. WETMORE,
*Executrix of Charles P. Wetmore, deceased.*